(12) United States Patent
Fujii et al.

(10) Patent No.: US 6,959,646 B2
(45) Date of Patent: Nov. 1, 2005

(54) WALLPAPER MANUFACTURING METHOD, WALLPAPER MANUFACTURING APPARATUS, AND PROGRAM FOR CAUSING COMPUTER TO FUNCTION AS WALLPAPER MANUFACTURING APPARATUS

(75) Inventors: Toru Fujii, Tokyo (JP); Nobuo Saida, Koganei (JP)

(73) Assignee: Olympus Corporation, Tokyo (JP)

( * ) Notice: Subject to any disclaimer, the term of this patent is extended or adjusted under 35 U.S.C. 154(b) by 62 days.

(21) Appl. No.: 10/777,892

(22) Filed: Feb. 12, 2004

(65) Prior Publication Data

US 2004/0162766 A1    Aug. 19, 2004

Related U.S. Application Data

(62) Division of application No. 09/792,155, filed on Feb. 23, 2001, now Pat. No. 6,715,423.

(30) Foreign Application Priority Data

Feb. 25, 2000  (JP) .............................. 2000-049721
Oct. 4, 2000   (JP) .............................. 2000-305173

(51) Int. Cl.$^7$ ............................................ B41F 1/54
(52) U.S. Cl. ........................ 101/484; 101/483; 705/27
(58) Field of Search ........ 101/483–485; 358/448–453; 704/26, 27

(56) References Cited

U.S. PATENT DOCUMENTS

| 5,291,395 | A | 3/1994 | Abecassis ..................... 705/27 |
| 5,751,829 | A | 5/1998 | Ringland et al. ........... 382/100 |
| 6,354,212 | B1 | 3/2002 | Krinsky ...................... 101/483 |
| 6,631,683 | B2 * | 10/2003 | Krinsky ..................... 101/483 |
| 2004/0236634 | A1 * | 11/2004 | Ruuttu ........................ 705/26 |

FOREIGN PATENT DOCUMENTS

| JP | 04216881 A | 8/1992 |
| JP | 10-309764 | 11/1998 |

* cited by examiner

*Primary Examiner*—Minh Chau
(74) *Attorney, Agent, or Firm*—Scully, Scott, Murphy & Presser

(57) ABSTRACT

An image of a design pattern of wallpaper stored in a data base (DB) is viewed by a user computer of a user who is a general consumer or a contractor from a server computer provided in a head office of a wallpaper manufacturer through the Internet. Further, upon accepting an order of wallpaper from the user who saw the image by the user computer, the server computer fetches the image of the design pattern from the DB. A wallpaper printer then prints the image on a wallpaper sheet, thereby manufacturing the wallpaper desired by the user. The produced wallpaper is delivered to the user who gave out the order by, for example, a door-to-door delivery service.

7 Claims, 14 Drawing Sheets

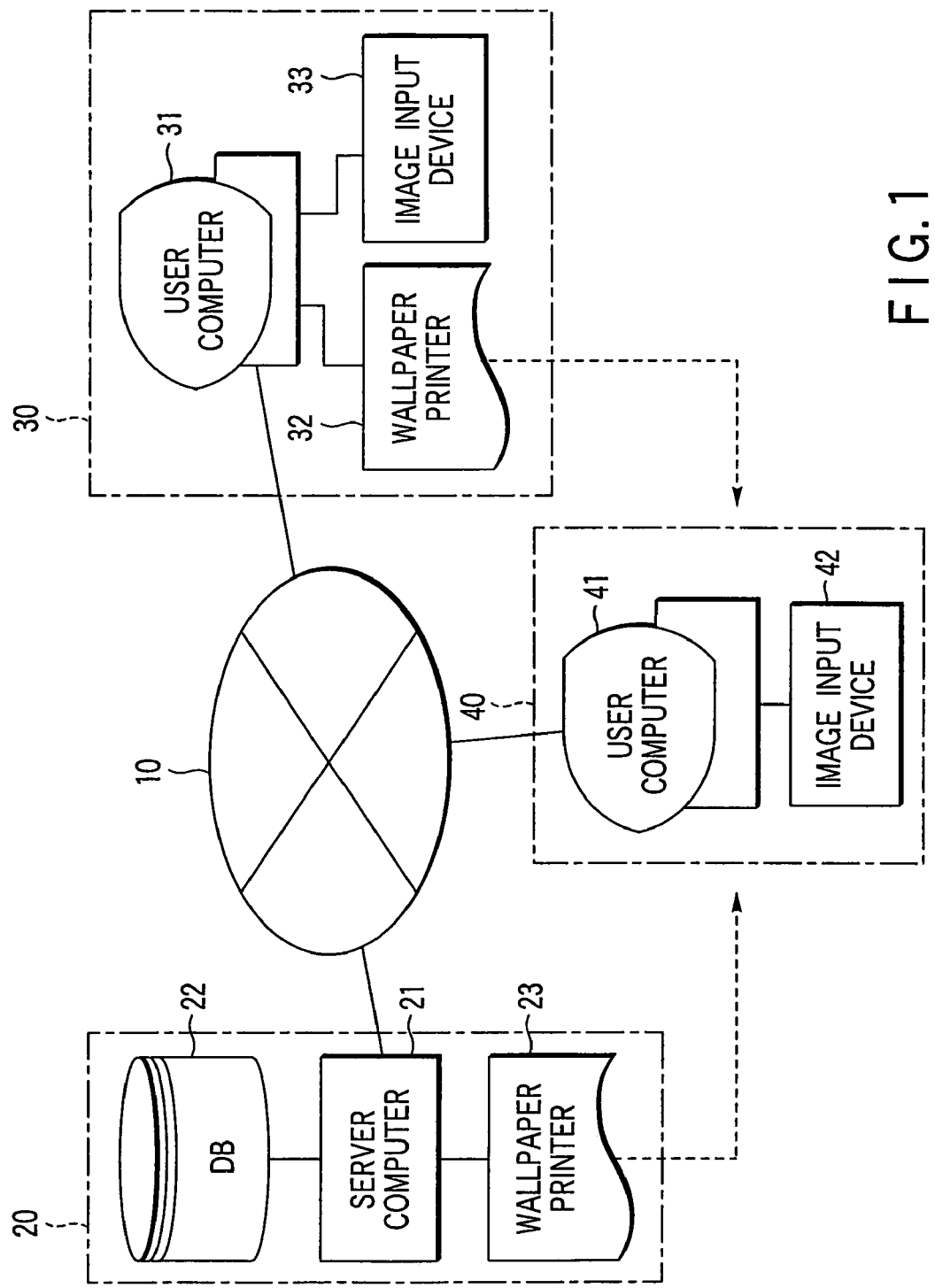
F I G. 1

FIG. 3E

DESIGNATE SIZE OF ONE PATTERN

VERTICAL [ ] mm ○ LINK
HORIZONTAL [////] mm ●

DESIGNATE OUTPUT SIZE
VERTICAL [92] cm
HORIZONTAL [ ] m

[DETERMINE] [RETURN]

DESIGNATE MATERIAL

○ EMBOSSED, OLEFIN WALLPAPER
● EMBOSSED, POLYVINYL CHLORIDE WALLPAPER
○ LAMINATED, DECORATED SHEET
○ LAMINATED, DECORATED SHEET, WITH ADHESIVE

[DETERMINE] [RETURN]

DESIGNATE DESTINATION

● SAME AS PREVIOUS ONE
○ SPECIFIED ADDRESS

ADDRESS [           ]
NAME    [           ]
TELEPHONE [    ]

[DETERMINE] [VIEW]

CHARGE IS AS FOLLOWS

PATTERN   No. 1011001
MATERIAL  EMBOSSED, OLEFIN WALLPAPER
SIZE      92cmX30m
CHARGE    ¥OOOO
DELIVERY  ESTIMATED DELIVERY
PERIOD    DATE O/O

[ORDER] [CANCEL]

IS THIS DATA FAIR ENOUGH?

DO YOU WANT REPEAT (ARRANGEMENT) MODIFICATION?
○ AUTOMATED ⊙ MANUAL ○ DISABLED
DISPLACEMENT PITCH ○ 0  ○ 1/4  ⊙ 1/2  ○ 3/4

[DETERMINE] [RETURN]

EXECUTE REPEAT MODIFICATION

○ PEN
⊙ COPY
⊙ PARALLEL
○ SYMMETRICAL

[DETERMINE] [RETURN]

SELECT PATTERN YOU WANT

NATURE / ORIGINAL

○ PREVIOUS REGISTRATION DATA
   REGISTRATION NUMBER [    ]
⊙ NEW REGISTRATION

[DETERMINE] [RETURN]

SELECT DATA TO BE REGISTERED

FILE SELECTION [    ]

[DETERMINE] [RETURN]

41J

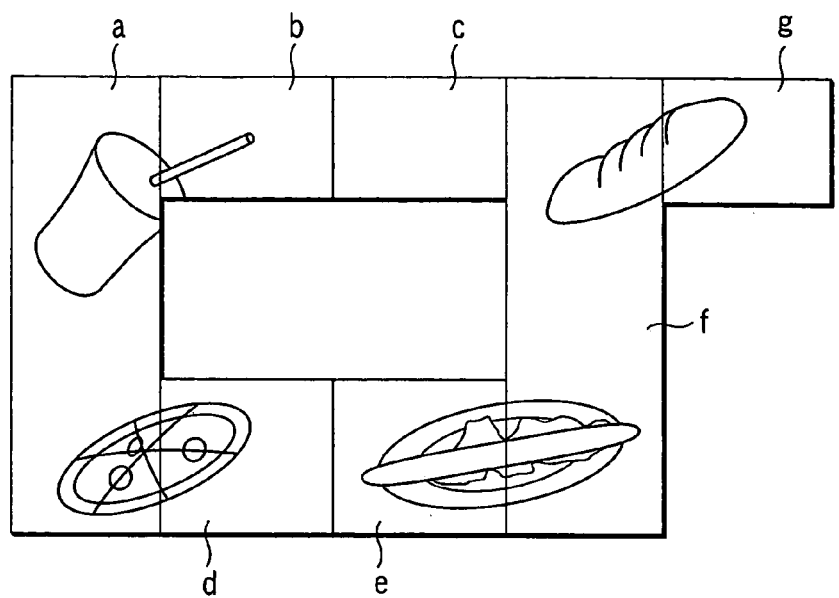
FIG. 13
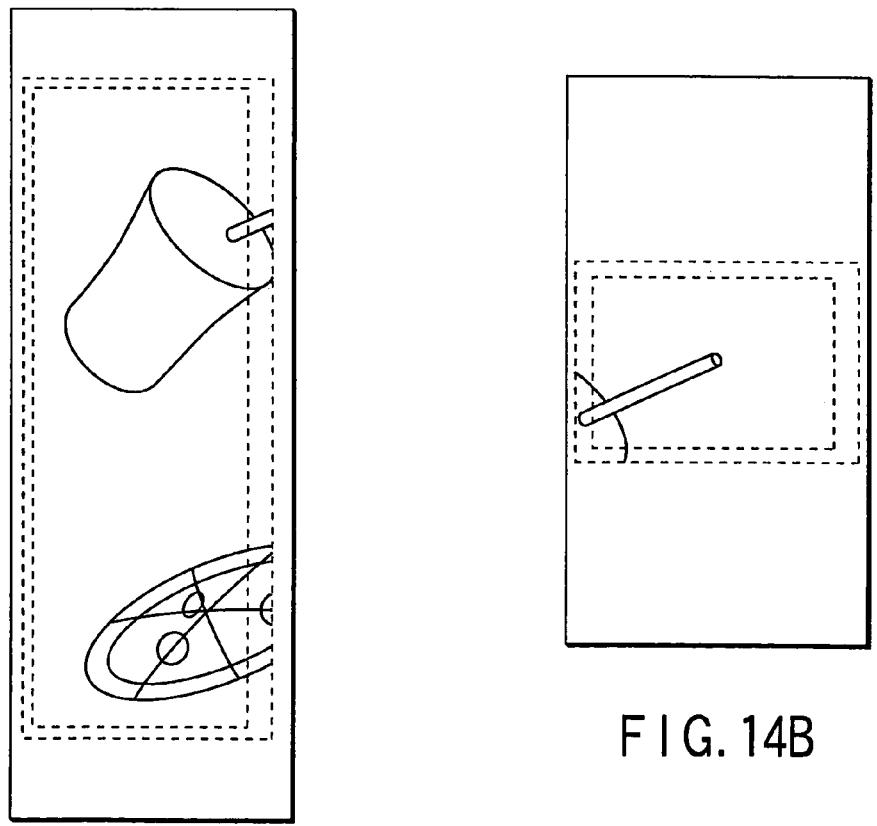
FIG. 14A
FIG. 14B

WALLPAPER MANUFACTURING METHOD, WALLPAPER MANUFACTURING APPARATUS, AND PROGRAM FOR CAUSING COMPUTER TO FUNCTION AS WALLPAPER MANUFACTURING APPARATUS

CROSS-REFERENCE TO RELATED APPLICATIONS

This application is a divisional of 09/792,155 filed Feb. 23, 2001, now U.S. Pat. No. 6,715,423 which is based upon and claims the benefit of priority from prior Japanese Patent Applications No. 2000-049721, filed Feb. 25, 2000; and No. 2000-305173, filed Oct. 4, 2000, the entire contents of each of which are incorporated herein by reference.

BACKGROUND OF THE INVENTION

The present invention relates to a method and an apparatus for manufacturing wallpaper by printing a design on a wallpaper sheet, and a program for causing a computer to function as a wallpaper manufacturing apparatus. It is to be noted that the wallpaper herein means not only a material attached on a wall surface of an architectural structure but also a sheet having a printed design which is attached on a floor, a ceiling, a door, a surface of a furniture or the like.

In recent years, various designs are used for interior materials of architectural structures, furniture and furnishing goods.

For example, also in case of wallpaper for an interior decoration used on a ceiling or a wall surface of an architectural structure, there are sold those having various designs or color paints applied on the surfaces thereof. As means for applying such a paint, a gravure painting system is used. Since such a gravure painting system, however, requires a photochemical graving technique, this system is not consequently suitable for manufacturing wallpaper meeting the small-lot and multi-product demand and solely satisfies the large-lot and small-product needs.

Recent demands of users are diversified, and production of wallpaper which meets the preference of each user is desired. However, such wallpaper which meets the preference of each user can not be expected to be sold to other users.

On the other hand, there has been recently is developed an ink-jet printer capable of color printing on paper having a large size such as A0 size or B0 size. Therefore, in order to meet the above-described small-lot and large-product needs, use of this ink-jet printer is considered. Further, a wallpaper sheet on which designs can be printed by such an ink-jet printer has been also developed, and, for example, Jpn. Pat. Appln. KOKAI Publication No. 10-309764 discloses such a wallpaper sheet.

However, even if a wallpaper sheet such as disclosed in the above Publication and the ink-jet printer are used to try to produce wallpaper with a design desired by a user, how to fetch the design desired by a user is yet to be sufficiently examined, and the above Publication does not disclose such a method.

Moreover, in the prior art, wallpaper is partially wasted when attaching the wallpaper onto a wall surface in order to match designs. That is, a part of the wallpaper is cut and wasted for a part of a wall surface such as a door or a window on which no wallpaper is attached in order to avoid the discontinuous design.

This problem can be solved by using an ink-jet printer capable of color-printing on paper having a large size to print a desired design. In case of printing by using such a printer, however, the following problems occur.

1. When one design runs off the width range of paper; sheets of wallpaper must be printed one by one with a pattern designed based on a calculation for assuring the design continuity between adjacent sheets of wallpaper, which leads to the deteriorated efficiency.

2. Similarly, at a part where a sheet of wallpaper is adjacent to another sheet of wallpaper, attachment is carried out with an overlap portion, but sheets of wallpaper must be printed one by one by calculating the design with which the overlap is previously assured, which leads to the deteriorated efficiency.

3. The post-treatment may be difficult in some cases depending on a size or a shape of printed wallpaper.

4. It is necessary to specify which part in the entire wallpaper corresponds to the printed wallpaper at a work site.

BRIEF SUMMARY OF THE INVENTION

In view of the above-described drawbacks in the prior art, it is an object of the present invention to provide a wallpaper manufacturing method and a wallpaper manufacturing apparatus which can accept from a user an order of wallpaper having a design desired by the user and easily produce small quantities and a large variety of wallpaper in accordance with that order, and to provide a program for causing a computer to function as the wallpaper manufacturing apparatus.

Further, it is another object of the present invention to provide a wallpaper manufacturing method and a wallpaper manufacturing apparatus which can support a layout work and the like of wallpaper and obtain wallpaper suitable for a surface on which the wallpaper is attached, and to provide a program for causing a computer to function as the wallpaper manufacturing apparatus.

According to a first aspect of the present invention, there is provided a wallpaper manufacturing method, comprising the steps of:

storing design data of the wallpaper in a storage medium;

inputting accepting order information including amount information concerning an amount of the wallpaper and design information concerning a design of the wallpaper;

fetching design data from the storage medium based on the design information in the inputted accepting order information; and printing, on wallpaper sheet, the design data fetched from the storage medium by a quantity led from the amount information of the wallpaper in the inputted accepting order information.

According to a second aspect of the present invention, there is provided a wallpaper manufacturing method, comprising the steps of:

inputting dimension and shape information of a wall surface on which wallpaper is attached;

determining a positional relationship between the wall surface and a design by applying design data of the wallpaper on a virtual wall surface based on the inputted dimension and shape information;

determining on the virtual wall surface a shape and a position of each of a plurality of pieces of wallpaper attached on the wall surface while taking a width of the wallpaper into consideration; and determining a design, a dimension and a shape of each of a plurality of the pieces of wallpaper from the determined positional relationship between the wall surface and the design and the determined shape and position of each of a plurality of the pieces of wallpaper.

According to a third aspect of the present invention, there is provided a wallpaper manufacturing apparatus, comprising:

a storage medium for accumulating design data of wallpaper;

an input device for inputting accepting order information including amount information concerning an amount of the wallpaper and design information concerning a design of the wallpaper;

a fetch device for fetching the design data from the storage medium based on the design information in the accepting order information inputted by the input device; and a printer for printing on a wallpaper sheet the design data fetched from the storage medium by the fetch device by a quantity led from the amount information of the wallpaper in the accepting order information inputted by the input device.

According to a fourth aspect of the present invention, there is provided a wallpaper manufacturing apparatus, comprising:

an input device for inputting dimension and shape information of a wall surface on which wallpaper is attached;

a positional relationship determining device for determining a positional relationship between the wall surface and a design by applying design data of the wallpaper on a virtual wall surface based on the dimension and shape information inputted from the input device;

a shape and position determining device for determining on the virtual wall surface a shape and a position of each of a plurality of pieces of wallpaper attached on the wall surface while taking a width of the wallpaper into consideration; and a wallpaper determining device for determining a design, a dimension and a shape of each of a plurality of the pieces of wallpaper from the positional relationship between the wall surface and the design determined by the positional relationship determining device and the shape and the position of each of a plurality of the pieces of wallpaper determined by the shape and position determining device.

According to a fifth aspect of the present invention, there is provided a wallpaper manufacturing apparatus, comprising:

storage means for accumulating design data of wallpaper;

input means for inputting accepting order information including amount information concerning an amount of the wallpaper and design information concerning a design of the wallpaper;

fetch means for fetching the design data from the storage means based on the design information in the accepting order information inputted by the input means; and print means for printing on a wallpaper sheet the design data fetched from the storage means by the fetch means by a quantity led from the amount information of the wallpaper in the accepting order information inputted by the input means.

According to a sixth aspect of the present invention, there is provided a wallpaper manufacturing apparatus, comprising:

input means for inputting dimension and shape information of a wall surface on which wallpaper is attached;

positional relationship determining means for determining a positional relationship between the wall surface and a design by applying design data of the wallpaper on a virtual wall surface based on the dimension and shape information inputted from the input means;

shape and position determining means for determining on the virtual wall surface a shape and a position of each of a plurality of pieces of wallpaper attached on the wall surface while taking a width of the wallpaper into consideration; and wallpaper determining means for determining a design, a dimension and a shape of each of a plurality of the pieces of wallpaper from the positional relationship between the wall surface and the design determined by the positional relationship determining means and the shape and the position of each of a plurality of the pieces of wallpaper determined by the shape and position determining means.

According to a seventh aspect of the present invention, there is provided a program for causing a computer to execute following processing, comprising:

processing for storing design data of wallpaper in a storage medium;

processing for inputting accepting order information including amount information concerning an amount of the wallpaper and design information concerning a design of the wallpaper;

processing for fetching design data from the storage medium based on the design information in the inputted accepting order information; and processing for printing the design data fetched from the storage medium on a wallpaper sheet by a quantity led from the amount information of the wallpaper in the inputted accepting order information.

According to an eighth aspect of the present invention, there is provided a program for causing a computer to execute following processing, comprising:

processing for inputting dimension and shape information of a wall surface on which wallpaper is attached;

processing for determining positional relationship between the wall surface and a design by applying design data of the wallpaper on a virtual wall surface based on the inputted dimension and shape information;

processing for determining on the virtual wall surface a shape and a position of each of a plurality of pieces of the wallpaper attached on a wall surface while taking a width of the wallpaper into consideration; and processing for determining a dimension and a shape of each of a plurality of pieces of the wallpaper from the determined positional relationship between the wall surface and the design and the determined shape and position of each of a plurality of the pieces of the wallpaper.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing a structure of a wallpaper manufacturing apparatus according to a first embodiment according to the present invention;

FIG. 3E is a view showing a size designation screen shown in the display of the user computer;

FIG. 3F is a view showing a material designation screen shown in the display of the user computer;

FIG. 3G is a view showing a destination input screen shown in the display of the user computer;

FIG. 3H is a view showing an order information display screen shown in the display of the user computer;

FIG. 3I is a view showing an original selection screen shown in the display of the user computer;

FIG. 3J is a view showing a data designation screen displayed in the display of the user computer;

FIG. 3K is a view showing a data confirmation screen shown in the display of the user computer;

FIG. 3L is a view showing a repeat modification screen shown in the display of the user computer;

FIG. 13 is a view showing an example of a wall surface layout;

FIG. 14A is a view showing a screen of the display in the terminal device illustrating a result of the finalized dimension, shape and pattern of wallpaper a in FIG. 13;

FIG. 14B is a view showing a screen of the display of the terminal device illustrating a result of the finalized dimension, shape and pattern of wallpaper b in FIG. 13;

DETAILED DESCRIPTION OF THE INVENTION

Figure 2A:
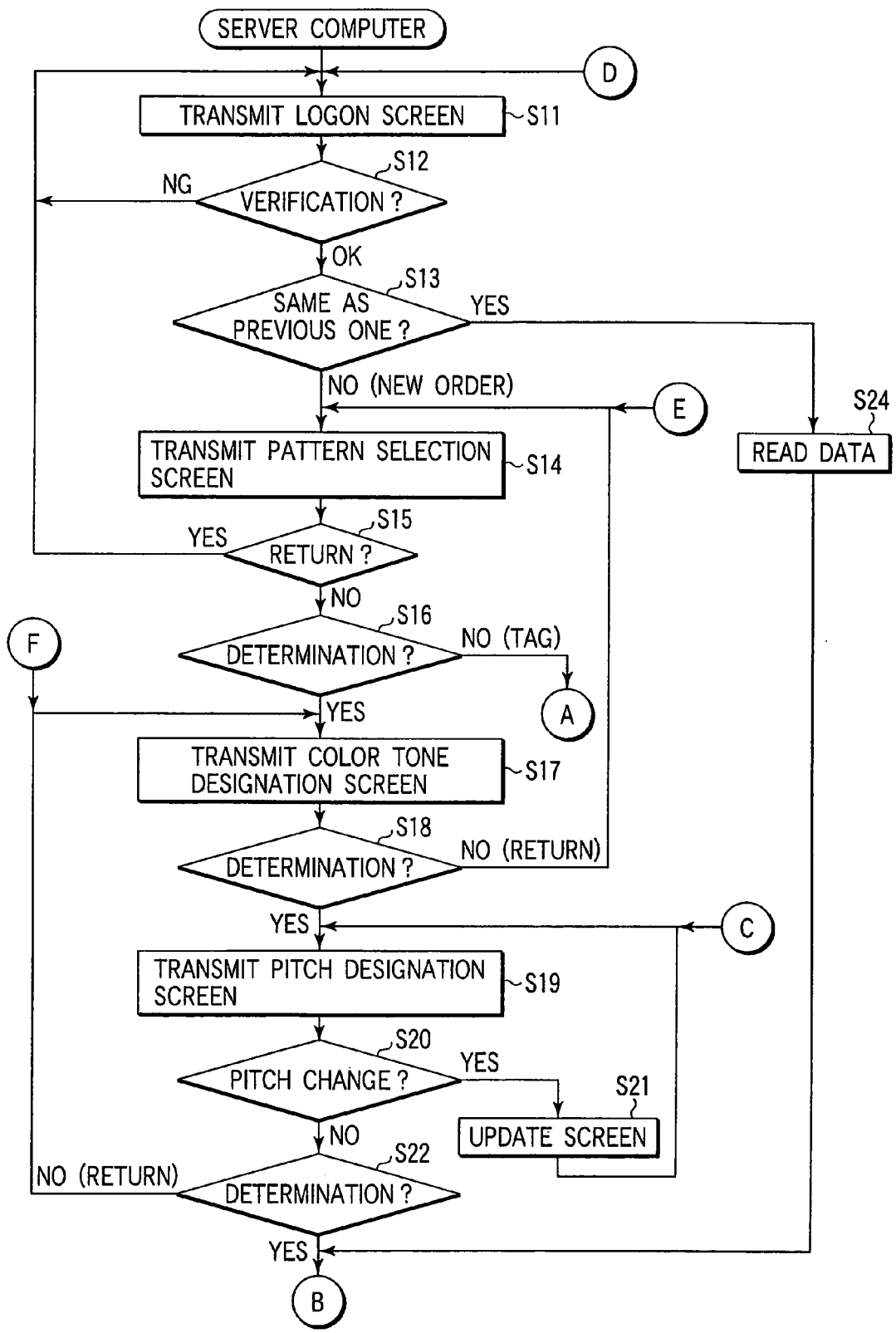
FIGS. 2A to 2C are views showing flowcharts of a series of processing executed by a server computer provided in a head office of a wallpaper manufacturer.

Preferred embodiments according to the present invention will now be described hereinafter with reference to the accompanying drawings.

[First Embodiment]

FIG. 1 is a view showing a structure of a wallpaper manufacturing apparatus according to a first embodiment of the present invention.

To a communication line (for example, the Internet 10) are connected a server computer 21 provided in a head office 20 of a wallpaper manufacturer, a user computer 31 provided in an authorized factory 30 of the wallpaper manufacturer located in each area, and a user computer 41 of a general consumer or a contractor (a builder, a design office, a sales outlet and others) 40 directly or through a service trader called a provider.

A data base (DB) 22 and a wallpaper printer 23 are connected to the server computer 21 in the head office 20 of the wallpaper manufacturer.

Here, the DB 22 holds pattern data of multiple designs to be printed on a predetermined wallpaper sheet. Further, the DB 22 holds various data such as customer data or accepting order/shipping order data. The wallpaper printer 23 is a large-sized paper printer for printing a design on a predetermined wallpaper sheet, and this is, e.g., an ink-jet printer using an oil-based pigment ink.

It is to be noted that the oil-based pigment ink is used because it is superior in the water resistance and the light resistance as compared with a water-based ink. Therefore, in the light of use of the wallpaper, the oil-based pigment ink is suitable for printing a design on a wallpaper sheet. The ink-jet printer is used because it can print irrespective of some irregularities on a wallpaper sheet so that the wallpaper sheet with embossed effect can be used.

In addition, to the user computer 31 in the authorized factory 30 of the wallpaper manufacturer are connected a wallpaper printer 32 similar to the wallpaper printer 23 in the head office 20, and an image input device 33.

Here, various notifications mentioning types of materials as a wallpaper sheet to be used, types of printers to be used, how to print a pattern, types of wall surfaces on which the wallpaper is attached and others must be submitted to a supervisory authority such as a fire department in order to be certified under the Fire Defense Law. That is, a general consumer or a contractor 40 can not simply obtain wallpaper sheets and a printer to manufacture wallpaper. Accordingly, only the head office 20 or the authorized factory 30 of the wallpaper manufacturer can produce wallpaper.

It is to be noted that the image input device 33 is a scanner or a digital camera used for reading an illustration or a photograph as an original image of a design for wallpaper, such an illustration or a photograph being brought by a general consumer or a contractor who is going to give out an order of wallpaper.

Additionally, an image input device 42 can be also connected to the user computer 41 of the general consumer or the contractor 40.

Thus, in the wallpaper manufacturing apparatus having such an arrangement, the general consumer or the contractor 40 uses his/her user computer 41 to access to a web page for ordering on the Internet 10 realized by the server computer 21 and the like in the head office 20 of the wallpaper manufacturer in order to place an order of wallpaper with a desired design in accordance with the desired width and length, as will be described later. The head office 20 in the wallpaper manufacturer then uses the wallpaper printer 23 to print the wallpaper according to the order and delivers the printed wallpaper to the general consumer or the contractor 40 who gave out the order. Alternatively, in the authorized factory 30 of the wallpaper manufacturer situated at a place close to an address of the general consumer or the contractor 40 who gave out the order, the wallpaper printer 32 is used to print the wallpaper according to the order and the wallpaper is delivered to the general consumer or the contractor 40 who gave out the order. In the latter case, a plurality of items of design data held in the DB 22 in the head office 20 of the wallpaper manufacturer can be supplied to each authorized factory 30 in advance in the form of, e.g., a CD-ROM and the like, and the DB is then constructed in the authorized factory 30. It is, therefore, good enough to supply only ordering data from the server computer 21 in the head office 20 to the user computer 31 in the authorized factory 30 without sending image data having a large amount of data.

Furthermore, if the authorized factory 30 of the wallpaper manufacturer takes a form of a store, the general consumer or the contractor 40 can go to the authorized factory 30 in place of operating its own user computer 41. The general consumer or the contractor 40 can leave the operation of the user computer 31 in the authorized factory 30 to a store personnel and easily, place an order. Moreover, since it is possible to manufacture a sample by the wallpaper printer 32 in the store, a real product can be advantageously confirmed before giving an actual order.

Figure 2B:
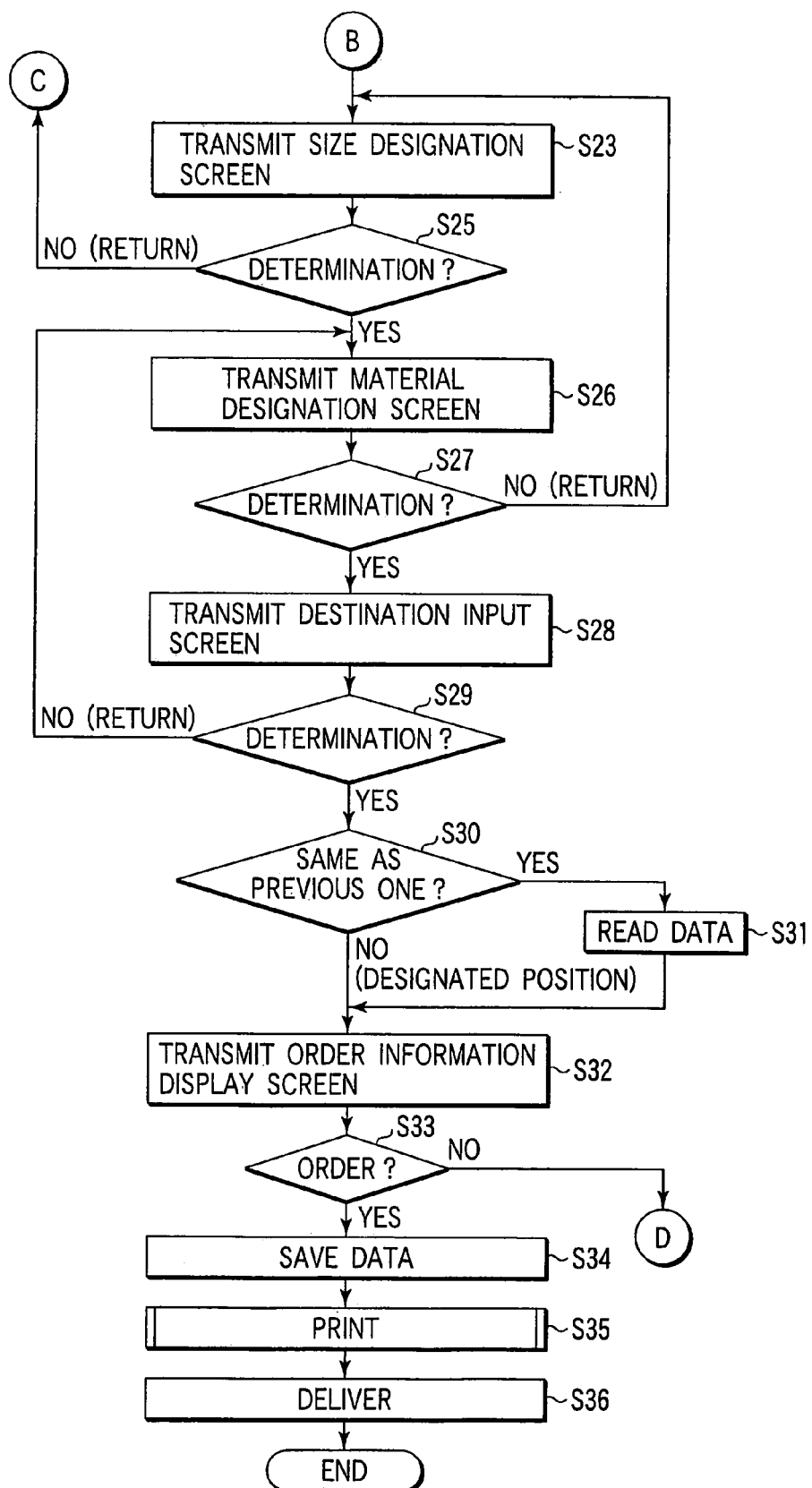
Figure 2C:
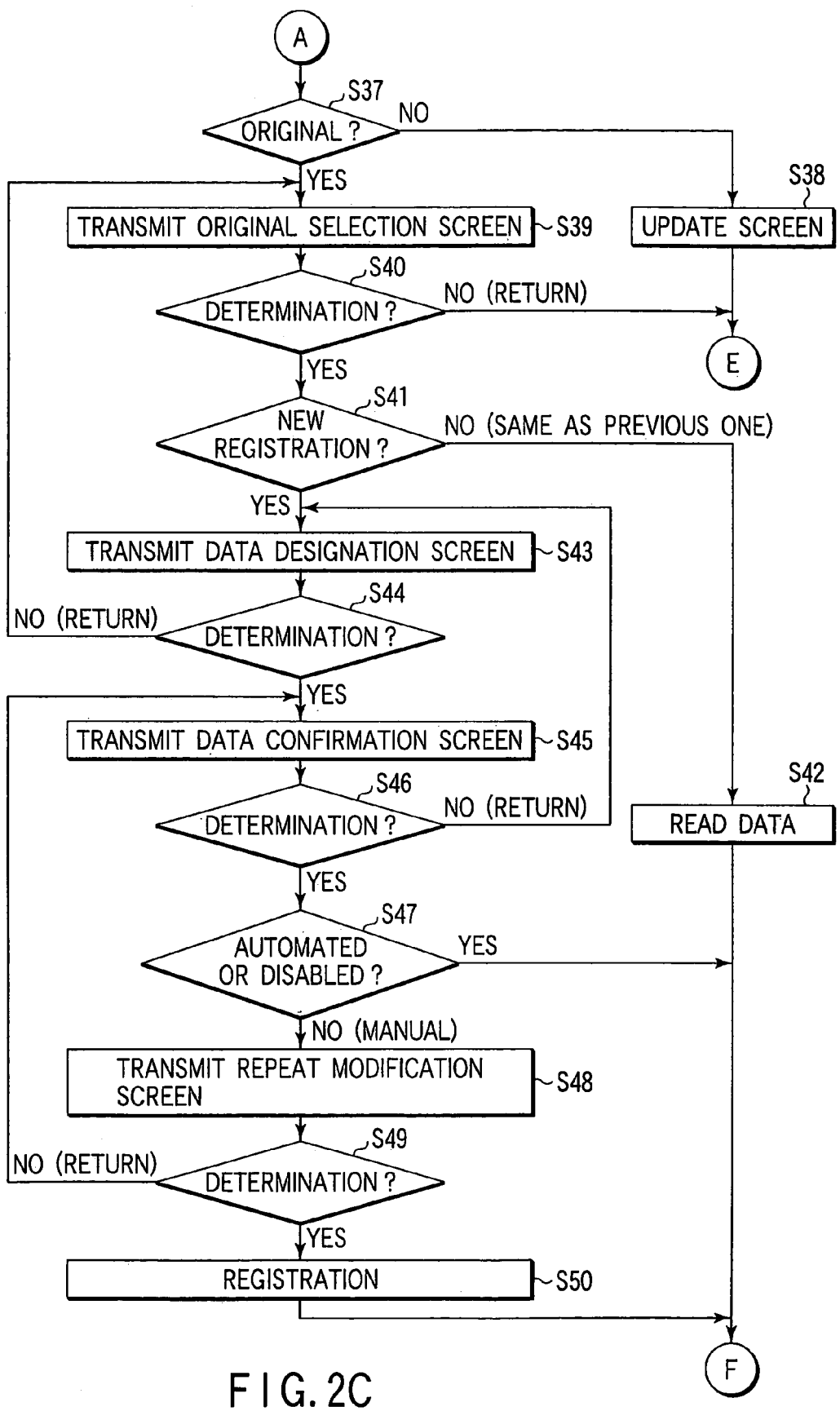

FIGS. 2A to 2C show flowcharts of a series of processing executed by the server computer 21 provided in the head office 20 of the wallpaper manufacturer in order to carry out the above-described operation. It is to be noted that these processing flowcharts show the operation when the user computer 41 of the general consumer or the contractor 40 accessed to a web page for ordering of that manufacturer.

Figures 3A, 3B, 3C, 3D:
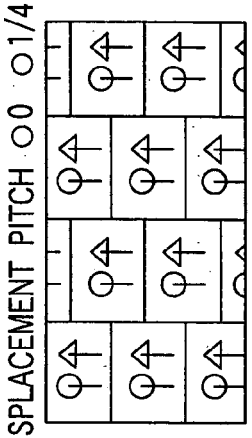
FIG. 3A is a view showing a logon screen shown in a display of a user computer.
FIG. 3B is a view showing a pattern selection screen shown in the display of the user computer.
FIG. 3C is a view showing a color tone designation screen shown in the display of the user computer.
FIG. 3D is a view showing a pitch designation screen shown in the display of the user computer.

In other words, the server computer 21 transmits data for showing a logon screen 41A such as depicted in FIG. 3A on a display (not shown) of the user computer 41 to the user computer 41 through the Internet 10 in accordance with the access from the user computer 41 (step S11).

Then, when each item in the logon screen 41A has been inputted and an "input" button has been pressed, the input information is transmitted through the Internet 10. In response to this, the server computer 21 checks out a member by making reference to the DB 22 based on a member number and a password included in the input information (step S12). If it has been determined that an accessor is not an official member as a result of verification, the control returns to the processing of the step S11. Also, at this time, the user computer 41 may be informed of the fact that a member No. or a password is wrong. Incidentally, it is assumed that registration of a member itself has been already carried out on another registration page.

If it has been determined that the access was made from an official member as a result of verification, the server computer 21 makes judgment upon whether data representing "the same content as the previous one" is included in the received input information (step S13).

If it has been determined that data representing "the same content as the previous one" is not included in the input information, i.e., data representing "a new order" is included in the input information as a result of judgment, data for displaying a pattern selection screen 41B such as shown in FIG. 3B on the display of the user computer 41 is transmitted (step S14). In this case, a plurality of design patterns held in the DB 22 are classified in accordance with items such as "nature" or "building", and only thumb nail images of design patterns belonging to one classification item are read from the DB 22 to be arranged in the pattern selection screen 41B. This can reduce an amount of transmission data and increase the speed.

The pattern selection operation is executed in the pattern selection screen 41B. When information associated with that selection operation is transmitted, the server computer 21 makes judgment upon whether data representing the operation of a "return" button is included in the received information (step S15). When this data is included, the control returns to the processing of the step S11.

On the other hand, when it has been determined that the data representing the operation of the "return" button is not included in the received information, further judgment is made upon whether data representing the operation of a "determination" button is included in the received information (step S16). If this data is included, data for showing a color tone designation screen 41C such as shown in FIG. 3C on the display of the user computer 41 is transmitted (step S17). Here, data including an associated design pattern can be generated in the color tone designation screen 41C in accordance with the data representing a design pattern selected by the user included in the received information.

Further, the operation for designating the color tone is executed in the color tone designation screen 41C. When information associated with the designation operation is transmitted, the server computer 21 makes judgment upon whether data representing the operation of the "determination" button is included in the received information (step S18). If this data is not included, i.e., if it has been determined that data representing the operation of the "return" button is included, the control returns to the processing of the step S14.

On the other hand, if it has been determined that data representing the operation of the "determinations button is included, data for displaying a pitch designation screen 41D such as shown in FIG. 3D on the display of the user computer 41 is transmitted (step S19). At this time, the color tone of the selected design pattern is changed in accordance with the data representing the user-designated color tone included in the received information. Further, images of the design of the wallpaper having the changed color tones are produced in the pitch designation screen 41D, the images being aligned in the horizontal and vertical directions with a predetermined displacement pitch. In this embodiment, although the predetermined displacement pitch is 1/2, it is needless to say that any other pitch can be an initial value.

The operation for changing the pitch is executed in the pitch designation screen 41D. When information associated with the change operation is transmitted, the server computer 21 makes judgment upon whether data representing a change in the pitch is included in the received information (step S20). If it has been determined that this data is included, images representing the design of the wallpaper are generated in accordance with a pitch which has been specified to be changed (step S21). Thereafter, the control returns to the operation of the step S19, and data for displaying the pitch designation screen 41D including the produced images on the display of the user computer 41 is transmitted.

On the other hand, if it has been determined that the data representing a change in the pitch is not included in the received information, further judgment is made upon whether data representing the operation of the "determination" button is included in the received information (step S22). If it has been determined that the data is not included, i.e., the data representing the operation of the "return" button is included, the control returns to the processing of the step S17.

On the other hand, if it has been determined that the data representing the operation of the "determination" button is included, data concerning the design of the wallpaper is temporarily stored in a non-illustrated RAM. Data for displaying a size designation screen 41E such as shown in FIG. 3E on the display of the user computer 41 is then transmitted (step S23).

On the other hand, if it has been determined that data representing "the same content as the previous one" is included in the received information in the step S13, the design data of the wallpaper which is the last order by the member who was verified in the step S12 is read out from the DM 22 and this readout design data is temporarily stored in the non-illustrated RAM (step S24). Subsequently, the processing is advanced to the step S23, and data for displaying the size designation screen 41E on the display of the user computer 41 is transmitted.

It is to be noted that "link" in the size designation screen 41E means a mode in which setting one of the vertical and horizontal sizes can uniquely set the other size. In FIG. 3E, when the vertical size of the design pattern is set, the horizontal size of the same is automatically determined. Nothing can be, therefore, inputted for the horizontal size, and an input field for the horizontal size is identified for indicating the disabled input.

In the size designation screen 41E, the operation for designating the design pattern size and an output size of the wallpaper is executed. When information associated with the designation operation is transmitted, the server computer 21 makes judgment upon whether data representing the operation of the "determination" button is included in the received information (step S25). If it has been determined that the data is not included, i.e., the data representing the operation of the "return" button is included, the processing is returned to the step S19.

On the contrary, if it has been determined that the data representing the operation of the "determination" button is included, data concerning the design pattern size and the output size of the wallpaper included in the received information is temporarily stored in the non-illustrated RAM. Thereafter, data for displaying a material designation screen 41F such as shown in FIG. 3F on the display of the user computer 41 is transmitted (step S26).

In the material designation screen 41F, the operation for selecting a material of the wallpaper is carried out. When information associated with the selection operation is transmitted, the server computer 21 makes judgment upon whether the data representing the operation of the "determination" button is included in the received information (step S27). If this data is not included, i.e., if it has been determined that the data representing the operation of the "return" button is included, the processing is returned to the step S23.

On the contrary, if it has been determined that the data representing the operation of the "determination" button is included, the data representing the material included in the received information is temporarily stored in the non-illustrated RAM. Data for displaying a destination input screen 41G such as shown in FIG. 3G on the display of the user computer 41 is thereafter transmitted (step S28).

In the destination input screen 41G, the operation for designating a destination is carried out. When information associated with the designation operation is transmitted, the server computer 21 makes judgment upon whether the data representing the "determination" button is included in the received information (step S29). If it is not included, i.e., if it has been determined that the data representing the operation of the "return" button is included, the processing is returned to the step S26.

On the contrary, if it has been determined that the data representing the operation of the "determination" button is included, further judgment is made upon whether the data representing "the same content as the previous one" is included in the received information (step S30). If it has been determined that the data representing "the same content as the previous one" is included, data of the previous destination for the member verified in the step S12 is read from the DB 22 and temporarily stored in the non-illustrated RAM (step S31). Subsequently, based on the data temporarily stored in the RAM, data for displaying an order information display screen 41H such as shown in FIG. 3H on the display of the user computer 41 is transmitted (step S32).

Further, if it has been determined that the data representing "the same content as the previous one" is not included, the data of the destination included in the received information is temporarily stored in the non-illustrated RAM. The processing is then advanced to the step S32, and the data for displaying the order information display screen 41H on the display of the user computer 41 is transmitted.

Furthermore, the user confirms the content of order shipment from the order information display screen 41H. When the user operates an "order" button or a "cancel" button, information associated with the operation is transmitted to the server computer 21. When the information is received from the user computer 41, the server computer 21 makes judgment upon whether data representing the operation of the "order" button is included in the received information (step S33).

Here, if it has been determined that the data representing the operation of the "order" button is not included, i.e., data representing the operation of the "cancel" button is included, the processing is returned to the step S11. Of course, the processing may be returned to the step S14, the step S23 and others as well as the step S11.

Then, if it has been determined that the data representing the operation of the "order" button is included, the data temporarily stored in the RAM is saved in the DB 22 (step S34). Further, in accordance with the data, the design data is read from the DB 22, and the color change operation and the like is applied to the read design data. Subsequently, the pattern data is aligned with a designated pattern size at a selected pitch. The wallpaper is then printed by the printer 23 only in a designated output size (step S35).

Thereafter, the thus produced wallpaper is delivered to the above-described destination by using a door-to-door-delivery service and the like (step S36).

Of course, as mentioned above, the printing processing in the step S35 and the delivering processing in the step S36 can be executed by the authorized factory 30 near the destination. In this case, the printing processing and the delivering processing can be substituted by the processing for transmitting the data saved in the DB 22 to the user computer 31 in the authorized factory 30 through the Internet 10 and any other additional operation is not required.

Additionally, this authorized factory 30 may be situated in the head office 20. In this case, the data can be transmitted through an interoffice LAN and the like without using the Internet 10. In this case, substituting the printing processing and the delivering processing by the processing for transmitting the data saved in the DB 22 to the user computer 31 in the authorized factory 30 through the interoffice LAN and the like can similarly suffice.

Incidentally, if it has been determined that the data representing the operation of the "determination" button is not included in the received information in the step S16, i.e., if it has been determined that data representing the operation of any tag is included, further judgment is made upon whether data representing an "original" tag is included (step S37).

Here, if it has been determined that the data representing the "original" tag is not included, namely, data representing a tag such as a "building" tag other than the "original" tag is included, the thumb nail image of the design pattern associated with that tag is read from the DB 22 and arranged, thereby updating the pattern selection screen 41B (step S38). The processing is returned to the step S14, and the updated pattern selection screen 41B is transmitted.

Additionally, if it has been determined that the data representing the "original" tag is included, data for displaying an original selection screen 41I such as shown in FIG. 3I on the display of the user computer 41 is transmitted (step S39).

Further, the registration designation operation is executed in the original selection screen 41I. When information associated with the registration designation operation is transmitted, the server computer 21 makes judgment upon whether the data representing the operation of the "determination" button is included in the received information (step S40). If it has been determined that the data is not included, i.e., the data representing the operation of the "return" button is included, the processing is returned to the step S14.

On the contrary, if it has been determined that the data representing the operation of the "determination" button is included, judgment is made upon whether data representing "new registration" is included in the received information (step S41). If it has been determined that the data representing the "new registration" is not included, namely, data representing "previous registration data" is included, data of the original design pattern held in the DB 22 is read to be temporarily stored in the non-illustrated RAM based on data representing a user-specified registration number included in the received information (step S42). Thereafter, the processing is advanced to the step S17, and a color tone designation screen 41C using the data of the design pattern is produced to be transmitted to the user computer 41.

On the other hand, if it has been determined that the data representing the "new registration" is included, data for displaying a data designation screen 41J such as shown in FIG. 3J on the display of the user computer 41 is transmitted (step S43).

Further, the operation for selecting an image file of the design pattern which is to be newly registered is performed in the data designation screen 41J. When information associated with the selection operation is transmitted, the server computer 21 makes judgment upon whether the data representing the operation of the "determination" button is included in the received information (step S44). If the data is not included, namely, if it has been determined that the operation representing the operation of the "return" button is included, the processing is returned to the step S39.

On the other hand, if it has been determined that the data representing the operation of the "determination" button is included, the image data of the selected image file included in the received information is temporarily stored in the non-illustrated RAM. Data for displaying a data confirmation screen 41K such as shown in FIG. 3K which uses the image data as the design pattern on the display of the user computer 41 is transmitted (step S45).

Moreover, the confirmation operation is executed in the data confirmation screen 41K. When information associated with the confirmation operation is transmitted, the server computer 21 makes judgment upon whether the data representing the operation of the "determination" button is included in the received information (step S46). If the data is not included, i.e., if it has been determined that the data representing the operation of the "return" button is included, the processing is returned to the step S43.

On the contrary, if it has been determined that the data representing the operation of the "determination" button is included, further judgment is made upon whether data representing "automated" or "disabled" as repeat modification is included in the received information (step S47).

Figure 4A:
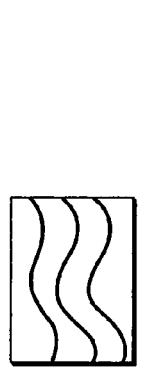
FIG. 4A is a view showing image data of a design pattern.
Figure 4B:
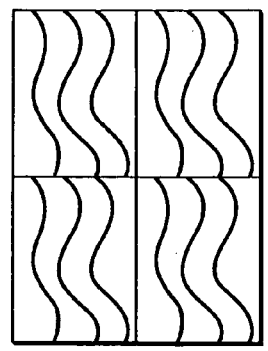
FIG. 4B is a view showing arrangement of image data depicted in FIG. 4A.
Figure 4C:
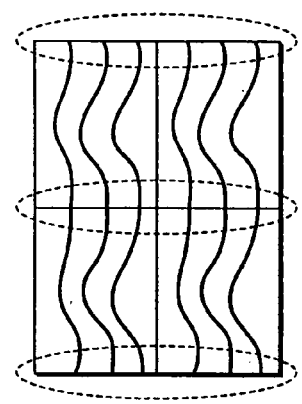
FIG. 4C is a view showing a point to which repeat modification is applied.
Figure 4D:
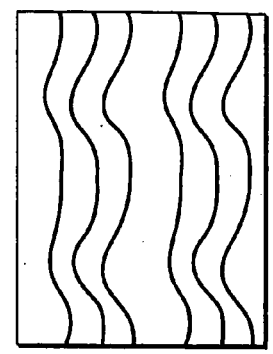
FIG. 4D is a view showing wallpaper using image data of a repeat-modified design pattern.

It is to be noted that the repeat modification means modification which is performed to prevent the design from becoming unnatural on a boundary portion between the design patterns when these design patterns are aligned. For example, in case of producing the wallpaper of the image data having a design pattern such as shown in FIG. 4A, when multiple pieces of this design pattern are simply aligned, they are shifted from each other on the boundary portion. As a countermeasure, modification is applied to the data on the boundary portion in such a manner that the patterns become continuous as indicated and surrounded by broken lines in FIG. 4C. As a result, it is possible to make the wallpaper having the continuous designs as shown in FIG. 4D. As to the modification of the design pattern, when one item of the original image data shown in FIG. 4A is modified, the modification is reflected on the entire aligned design patterns.

It is to be noted that any design pattern other than the original design patter is stored in the DB 22 as the image data modified in accordance with each displacement pitch, there is no need to execute this repeat modification processing.

Then, if it has been determined that the data representing automated" or "disabled" is included in the step S47, the processing is advanced to the step S17 where the image data of the original design pattern temporarily stored in the RAM is automatically modified or not modified. The color tone designation screen 41C is then created to be transmitted to the user computer 41.

On the contrary, if it has been determined that the data representing "automated" or "disabled" is not included, namely, data representing "manual" is included, the processing transmits data for displaying a repeat modification screen 41L such as shown in FIG. 3L which uses the image data of the original design pattern temporarily stored in the RAM on the display of the user computer 41 based on the data representing the displacement pitch included in the received information (step S48).

Further, the repeat modification operation is carried out in the repeat modification screen 41L. When information associated with the repeat modification operation is transmitted, the server computer 21 makes judgment upon whether the data representing the operation of the "determination" button is included in the received information (step S49). If the data is not included, i.e., if it has been determined that the data representing the operation of the "return" button is included, the processing is returned to the step S45.

On the contrary, if it has been determined that the data representing the operation of the "determination" button is included, data representing a repeat modification result included in the received information is temporarily stored in the non-illustrated RAM and registered in the DB 22 (step S50). At this time, the registration number is transmitted to the user computer 41. Thereafter, the processing is advanced to the step S17, and the color tone designation screen 41C using the repeat-modified image data of the design pattern temporarily stored in the RAM is created to be transmitted to the user computer 41.

As described above, it is possible to manufacture the wallpaper through the Internet 10 from the general consumer or the contractor 40 according to an order of the wallpaper with small quantities and large product classes and deliver the produced wallpaper to the orderer.

Incidentally, although the above has described the case where the operation is carried out while allowing the communication between the server computer 21 and the user computer 41, a program for executing the above-described operation may be first downloaded from the server computer 21 to the user computer 41. Then, display, selection and input of various screens may be executed on the user computer 41 side, and the determined information may be finally transmitted from the user computer 41 to the server computer 21.

[Second Embodiment]

A second embodiment according to the present invention will now be described.

In the second embodiment, a function for simulating an actual use condition of the wallpaper is added to the first embodiment. In other words, since the structure and the operation of the wallpaper manufacturing apparatus according to the second embodiment are substantially similar to those of the first embodiment, the following describes only a different part.

Figure 5:
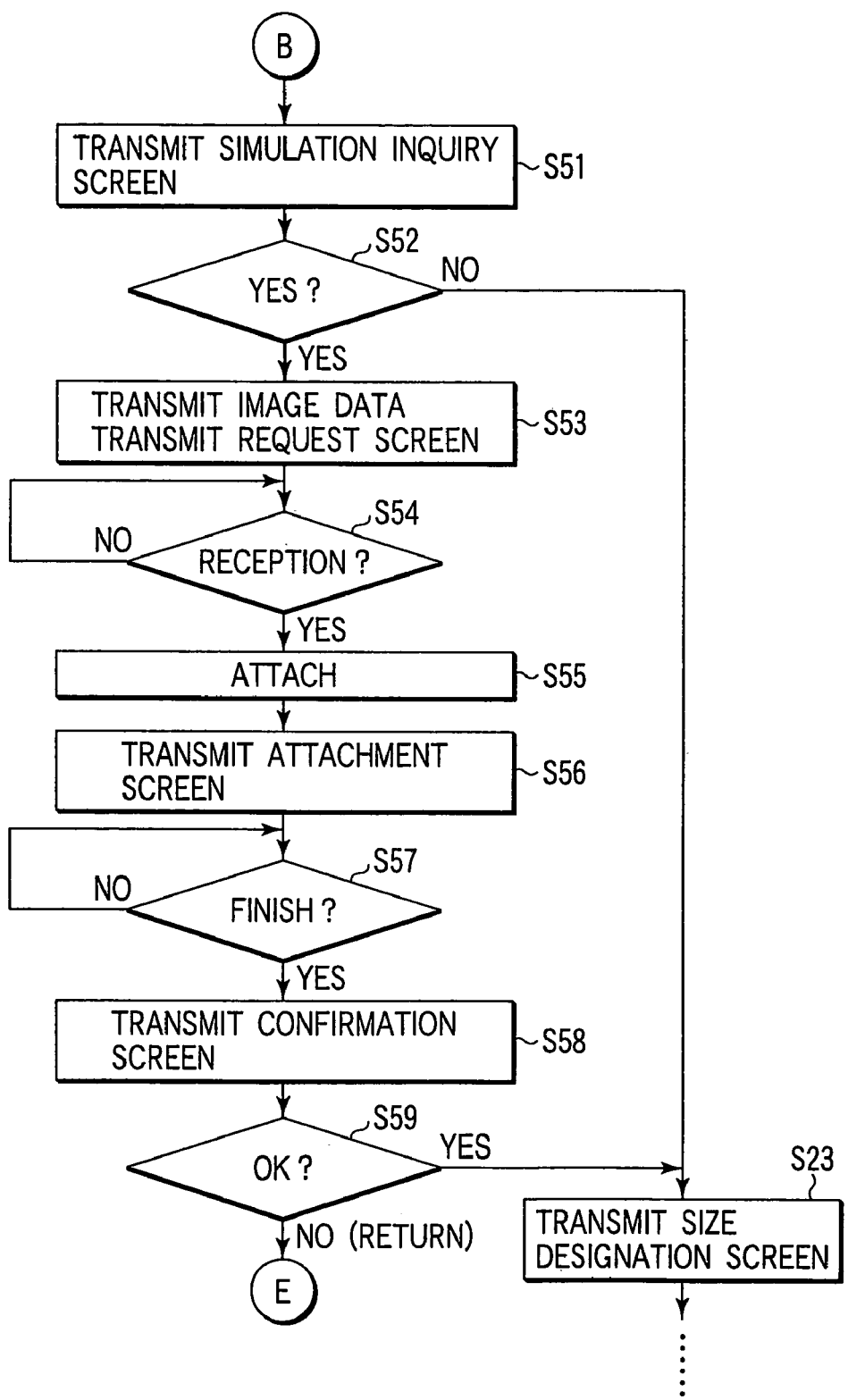
FIG. 5 is a view showing a characteristic part of a flowchart of processing executed by a server computer provided in a head office of a wallpaper manufacturer in a wallpaper manufacturing apparatus according to a second embodiment of the present invention.

In the second embodiment, as shown in FIG. 5, if it has been determined that the data representing the operation of the "determination" button is included in the received information in the step S22, or after reading the design data of the previously ordered wallpaper from the DB 22 in the step S24, data for displaying an inquiry screen (not shown) asking whether an actual use condition of the wallpaper is to be simulated on the display of the user computer 41 is transmitted (step S51).

In the inquiry screen, the operation for answering to the inquiry is performed in the inquiry screen. When information associated with the answering operation, the server computer 21 makes judgment upon whether data representing the operation of a "yes" button is included in the received information (step S52). If the data is not included, namely, if it has been determined that data representing the operation of a "no" button is included, the processing is advanced to the step S23 to transmit the data for displaying the size designation screen 41E on the display of the user computer 41.

On the contrary, if it has been determined that the data representing the operation of the "yes" button is included, data for displaying a screen requesting transmission of the image data of a room in which the wallpaper attached (not shown) on the display of the user computer 41 is transmitted (step S53).

Figure 6:
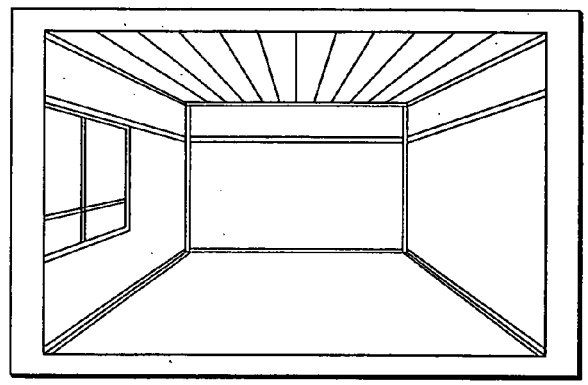
FIG. 6 is a view showing image data of a room in which wallpaper is attached.
Figure 7A:
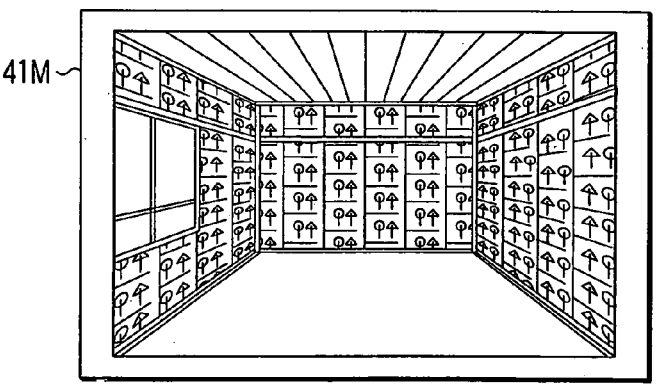
FIG. 7A is a view showing an attachment screen shown in a display of a user computer.

Furthermore, in response to the request, the user uses the user computer 41 to specify image data such as shown in FIG. 6 and a position at which the wallpaper is attached on the image data. Subsequently, when the user performs the transmission operation, the information is transmitted to the server computer 21 via the Internet 10. Upon receiving such image data and the data indicating the position at which the wallpaper is attached (step S54), the server computer 21 attaches the image data of the design pattern temporarily stored in the RAM at a specified position on the image data in accordance with data (step S55). Additionally, data for displaying an attachment screen 41M such as shown in FIG. 7A on the display of the user computer 41 is transmitted (step S56).

Figure 7B:
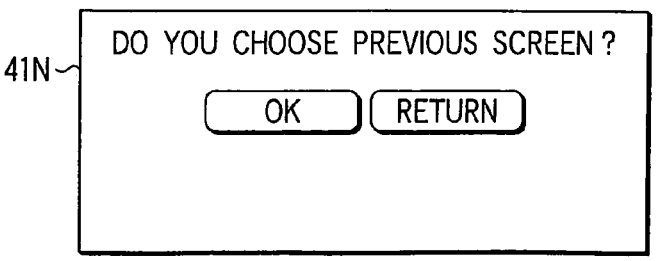
FIG. 7B is a view showing a confirmation screen shown in the display of the user computer.

Thereafter, a predetermined display termination operation such as mouse button clicking is performed in the user computer 41. When information associated with the display termination operation is transmitted (step S57), the server computer 21 transmits data for displaying a confirmation screen 47N such as shown in FIG. 7B on the display of the user computer 41 (step S58).

The confirmation operation is then executed in the user computer 41. When the information associated with the confirmation operation is transmitted, the server computer 21 makes judgment upon whether data representing the operation of an "OK" button is included in the received information (step S59). If the data is not included, i.e., if it has been determined that the data representing the operation of the "return" button is included, the processing is returned to the step S14.

On the contrary, if it has been determined that the data representing the operation of the "OK" button is included, the processing is advanced to the step S23 to transmit the data for displaying the size designation screen 41E on the display of the user computer 41.

Figure 8:
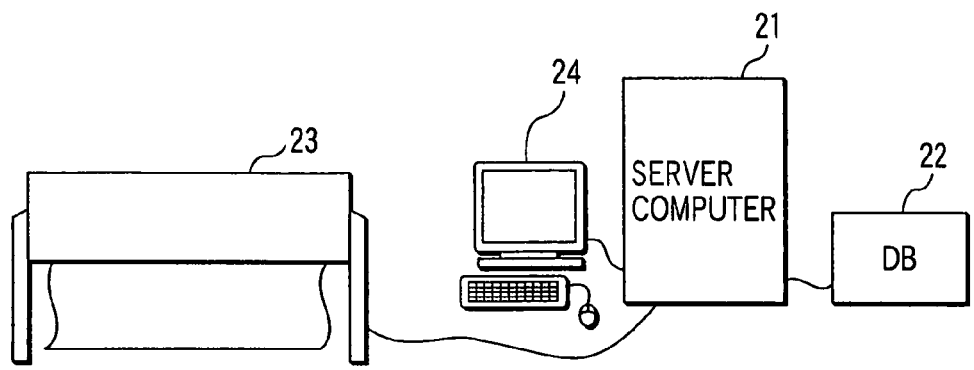
FIG. 8 is a view showing a structure of a stand-alone wallpaper manufacturing apparatus.

Incidentally, in the first and second embodiments, the description has been given on the assumption that the server computer 21 provided in the head office 20 of the wallpaper manufacturer, the user computer 31 provided in the authorized factory 30 of the wallpaper manufacturer placed in each area, and the user computer 41 of the general consumer or the contractor (a builder, a design office, a sales outlet and others) 40 are connected through a communication line such as the Internet 10. The present invention is not restricted thereto, and it is needless to say that the present invention can be constituted as a stand-alone wallpaper manufacturing apparatus. That is, as shown in FIG. 8, in a shop of the wallpaper manufacturer are provided the server computer 21, the DB 22, the wallpaper printer 23 as well as a wallpaper manufacturing apparatus constituted by a terminal device 24 functioning as the user computer 41 and the image input device 42. Consequently, the general consumer or the contractor 40 can go to that shop and easily order the wallpaper while leaving the operation to a shop assistant.

[Third Embodiment]

A third embodiment according to the present invention will now be described.

According to the third embodiment, when producing the wallpaper as in the first or second embodiment, the wallpaper is produced without incurring wastes based on the shape and the size of a wall surface onto which the wallpaper is actually attached.

For simplifying the explanation, the wallpaper manufacturing apparatus according to the third embodiment will be described as a stand-alone wallpaper manufacturing apparatus such as shown in FIG. 8.

(BLOCK DIAGRAM)

Figure 9:
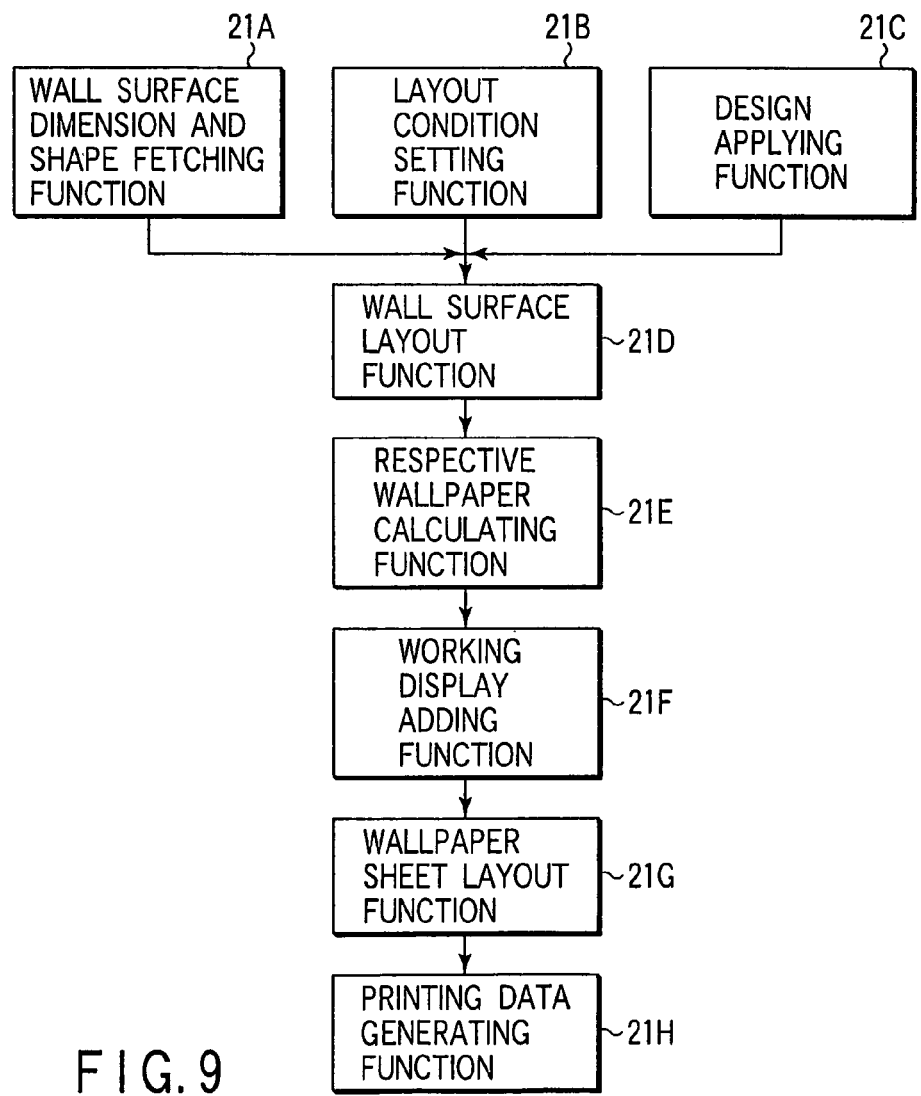
FIG. 9 is a function block diagram of a wallpaper layout program recorded in a storage medium in a server computer in a wallpaper manufacturing apparatus according to a third embodiment of the present invention.

FIG. 9 shows a function block diagram of a wallpaper layout program recorded on a storage medium in the server computer 21.

That is, the wallpaper layout program includes eight primary function blocks, i.e., a wall surface dimension and size fetching function block 21A, a layout condition setting function block 21B, a pattern applying function block 21C, a wall surface layout function block 21D, a respective wallpaper calculating function block 21E, a working display adding function block 21F, a wallpaper sheet layout function block 21G, and a printing data generating function block 21H. Each block is formed as a subroutine.

Here, the wall surface dimension and shape fetching function block 21A fetches dimension and shape information of a wall surface onto which the wallpaper is attached. The layout condition setting function block 21B sets conditions used for a layout. The pattern applying function block 21C supports determination of a pattern by applying the pattern on a wall surface. The wall surface layout function block 21D lays out wallpaper on a wall surface. The respective wallpaper calculating block 21E calculates the dimension and the shape of each piece of laid out wallpaper and arranges a corresponding part of the determined design on each piece of wallpaper. The working display adding function block 21F adds to each piece of wallpaper display of information of a position at which each piece of wallpaper is attached based on the wall surface layout and display of an index for positioning in the operation for attaching each piece of wallpaper. The wallpaper sheet layout function block 21G lays out each piece of wallpaper on a wallpaper sheet. The printing data generating function block 21H generates data for printing wallpaper.

(FLOW OF OPERATION)

Figure 10:
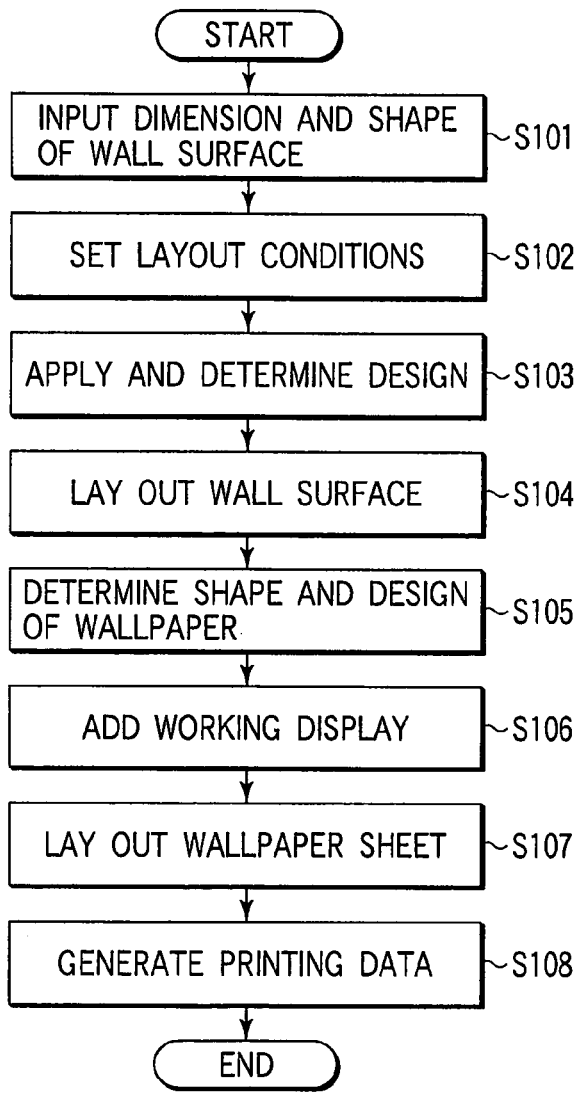
FIG. 10 is a view showing a flowchart for illustrating a work flow using the wallpaper manufacturing apparatus according to the third embodiment.

A flow of the operation according to this embodiment will now be described with reference to a flowchart of FIG. 10. Incidentally, if an OPERATION FOR "SETTING LAYOUT CONDITIONS" uses previously set conditions in this flowchart, this operation does not have to be executed. It is preferable that an OPERATION FOR "APPLYING AND DETERMINING A DESIGN" and an OPERATION FOR "LAYING OUT ON A WALL SURFACE" are alternately executed to obtain a combination of a design and a layout suitable for a wall surface.

OPERATION FOR "INPUTTING DIMENSION AND SHAPE INFORMATION OF WALL SURFACE" (step S101)

The wall surface dimension and shape fetching function block 21A is first used to input dimension and shape information of a wall surface on which the wallpaper is attached from the terminal device 24. This dimension and shape information may be a result of measuring an actual wall by using a conventionally used end-measuring machine, a laser end-measuring device and others, or information obtained by analyzing an image taken by a digital camera and the like, or information of an architectural CAD and the like. Further, the dimension and shape information means information from which the dimension and the shape can be led and does not necessarily mean data of a "length" and a "form". For example, this information may be position coordinate data of corner portions of a wall surface.

Figure 11:
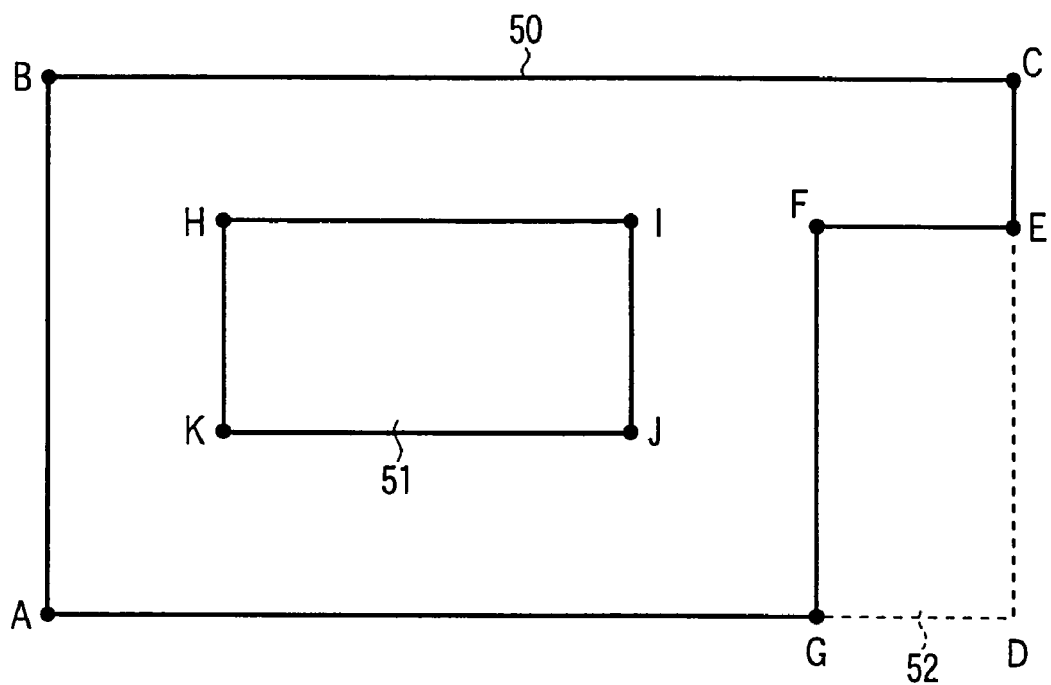
FIG. 11 is a view showing an example of a wall surface whose size and shape information is inputted from a terminal device.

FIG. 11 shows an example of a wall surface whose dimension and shape information is inputted from the terminal device 24. This wall surface 50 is a surface of a wall partitioning a cuisine and a dining hall in a restaurant on the dining hall side. There is an opening window portion 51 which is used for handing foods and drinks to guests at a central portion. Further, there is a notched portion 52 which is a door way to the cuisine on the right-hand side. In this embodiment, using a point A in the drawing as a starting point, the wall surface 50 is defined by inputting coordinate values of respective points from B to K in a unit of mm. Of course, it is also effective to input data of a three-dimensional CAD to automatically develop the wall having four directions on a two-dimensional plane, thereby obtaining the dimension and shape information.

Then, the inputted dimension and shape information is displayed on a display of the terminal device 24 as a graphic form of the wall surface.

OPERATION FOR "SETTING LAYOUT CONDITIONS" (step S102)

Subsequently, the layout condition setting function block 21B is used to set conditions used for a layout. Here, as an example of the condition used for a layout, there are a width of a sheet of wallpaper, a size of a margin of a design area, an amount of overlap of adjacent pieces of wallpaper (overlap amount), a size of a margin, and others. Additionally, in accordance with an order for attaching the pieces of wallpaper, the layout is carried out on a graphic form of the wall surface which is shown on the display of the terminal device 24. In general, when the connection of the pieces of the wallpaper is situated on the boundary between the walls or the connection is placed at a protruding corner portion when wrapping around a pillar, the wallpaper is apt be peeled off. As a countermeasure, outputs of the wallpaper sheets before and after the boundary or the corner portion are set narrower than a predetermined width. It is also important to set a length of each piece of wallpaper equal to or above a minimum length with which a device for a post-step (a pasting device and the like) can be used. From these conditions, necessary conditions are set.

It is to be noted that a result of this operation is saved in the DB 22. Therefore, the OPERATION FOR "SETTING LAYOUT CONDITIONS" does not have to be executed each time. If general condition is once set, this condition can be again used in the next and following processing.

OPERATION FOR "APPLYING AND DETERMINING PATTERN" (step S103)

The pattern applying function block 21C is used to select a design suitable for the wall surface 50. Since the design data is stored in the DB 22, the stored design data is fetched to be shown on the display of the terminal device 24. Then, a suitable design is selected while viewing the data. Since a custom-made deign must be created depending on cases, the design data manufactured by another system is recorded on a storage medium such as a FD and the storage medium is inserted into a non-illustrated drive of the server computer 21 in order to fetch the design data in such a case. Modifications can be applied to the design data in accordance with a direction from the terminal device 24. As modifications, there are scale-up, scale-down, deformation, color change, combination with another design, and others. The thus selected and modified design is applied onto a graphic form of the wall surface displayed on the display of the terminal device 24. When determining the design, a position of the wall surface 50 at which the selected design is arranged is also determined with taking a shape and the like of the wall surface 50 into consideration. Further, in this case, the design is laid out on the wall surface in such a manner that an important part of the design (a face part of a person, a logo part and others) is not situated on the boundary of the wallpaper sheets or on the corner portion.

Figure 12:
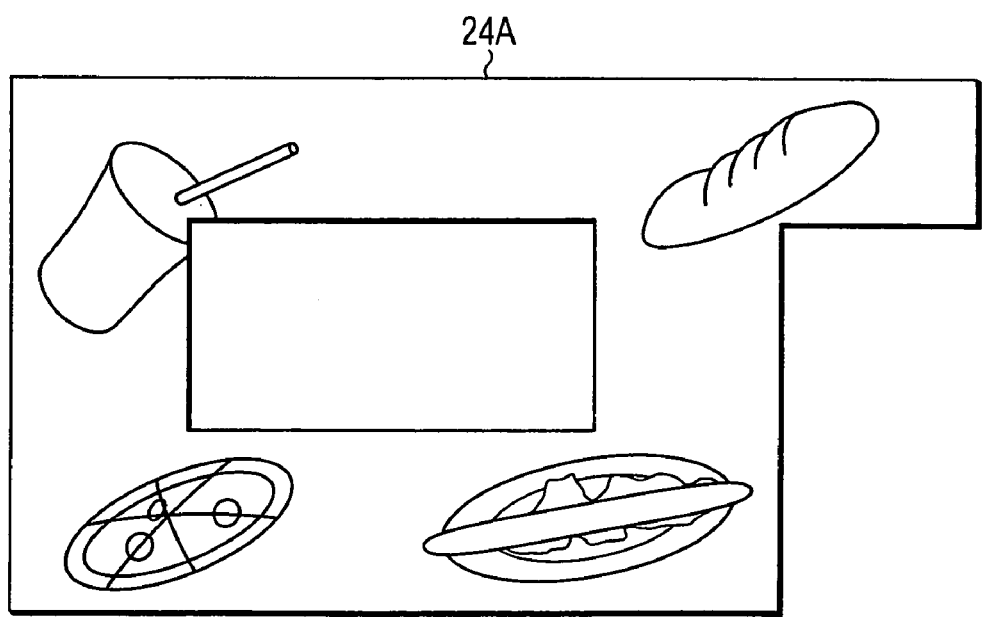
FIG. 12 is a view showing an example in which a determined design is applied to a shape of a wall surface shown in a display of a terminal device.

FIG. 12 shows an example where the determined design is applied to a wall surface graphic form 24A as a virtual wall surface shown on the display of the terminal device 24. In this embodiment, since the wall surface of a restaurant is exemplified, a design of foods and drinks provided at this restaurant is selected. In addition, the design of each of foods and drinks is arranged in such a manner the entire figure thereof can be possibly laid out.

OPERATION FOR "LAYING OUT WALL SURFACE" (step S104)

The wall surface layout function block 21D is then used to determine the wall surface layout based on the dimension and shape information, the layout conditions and the determined pattern. The wall surface layout shows a position of the wall surface 50 at which each piece of wallpaper is arranged when attaching the wallpaper on the wall surface 50. Here, the piece of wallpaper means wallpaper attached on a wall in a unit of one sheet. Since a layout program which operates on the server computer 21 creates/displays a layout plan based on the dimension and shape information, the wallpaper layout conditions and the design, an operator issues appropriate modification directions to perform this layout operation.

FIG. 13 shows an example of the wall surface layout. In this example, 7 pieces of wallpaper a to q constitute the wall surface. In Japan, in most cases, an architectural structure is designed in a unit of 90 cm, and it is often the case that this unit matches with a width of the wallpaper when taking a margin and an overlap width into consideration. In such a case, as shown in FIG. 13, each pieces of wallpaper can be formed into a rectangular shape, which is superior in the post-working property. If a shape of the wall is not up to standard, however, a shape of each wallpaper sheet may be irregular in some cases. Or even if it can be formed into a rectangular shape, it may have a width different from that of the wallpaper.

Operation for "Determining Shape and Design of Wallpaper" (step S105)

Subsequently, the respective wallpaper calculating function block 21E is used to determine the dimension, the shape and the design of each piece of wallpaper based on the wall surface layout determined by the OPERATION FOR "LAYING OUT THE WALL SURFACE" and the layout conditions set by the OPERATION FOR "SETTING LAYOUT CONDITIONS". This can be executed by adding an additional portion, an overlap portion and a margin to each one piece of the wallpaper determined by the OPERATION FOR "WALL SURFACE LAYOUT".

FIG. 14A shows that a result of the finalized dimension, shape and design of the piece of wallpaper a in FIG. 13 being displayed on the display of the terminal device 24. A rectangular surrounded by an innermost dotted line corresponds to the wall surface dimension of an associated part. A rectangular surrounded by an outer dotted line corresponds to addition of dimensions of the additional portion and the overlap portion to the wall surface dimension.

Further, a rectangular surrounded by an outer solid line shows an outer shape of the piece of wallpaper. In this example, the width of the outer shape matches with the width of the wallpaper sheet. A range of the design corresponds to the inner portion of the rectangular surrounded by the outer dotted line. Further, the outside of the design range (inside of the rectangular surrounded by the solid line and outside of the rectangular surrounded by the outer dotted line) corresponds to the margin. Furthermore, in actual printing, these dotted and solid lines are not printed.

The additional portion is provided in order to additionally print the width to some extent in view of the fact that an error is not allowed in the operation if the size of a portion to be printed on the wallpaper sheet is substantially equal to the wall surface dimension at the corresponding part.

If there are adjacent pieces of wallpaper, they are partially overlapped to be attached. The overlap portion is, therefore, a portion on which printing is additionally made for the overlap width.

In FIG. 14A, since there is an adjacent piece of wallpaper on the right-hand side, the width corresponding to a combination of the additional portion and the overlap portion is additionally printed. There is no adjacent piece of wallpaper on any other side, only the width of the additional portion is printed for good measure.

The wallpaper printer 23 can not print along the entire width of the wallpaper sheet on the right and left sides, and margins are necessarily made at right and left edges. Therefore, the margin is necessary. As to the upper and lower edge, the margin is prepared with taking the working property into consideration.

FIG. 14B shows a figure of the determined dimension and shape of the piece of wallpaper b in FIG. 13 being displayed on the display of the terminal device 24. In this case, if the wallpaper is short, it may not be applied to the pasting device in the post-step. The minimum margin is taken to intentionally elongate the wallpaper. Further, if the design pattern is short, a plurality of patterns are arranged at appropriate intervals and outputted together onto one sheet of wallpaper.

The dimension and shape of such wallpaper are automatically calculated by using the inputted conditions based on the wall surface layout. Of course, an operator can modify this result.

OPERATION FOR "ADDING WORKING DISPLAY" (STEP S106)

Subsequently, the working display adding function block 21F is used to add information of a position at which the piece of wallpaper is attached and a positioning index of the operation for attaching the piece of wallpaper as information used for the operation for attaching the piece of wallpaper to the margin and the overlap portion of each piece of wallpaper.

Figure 15:
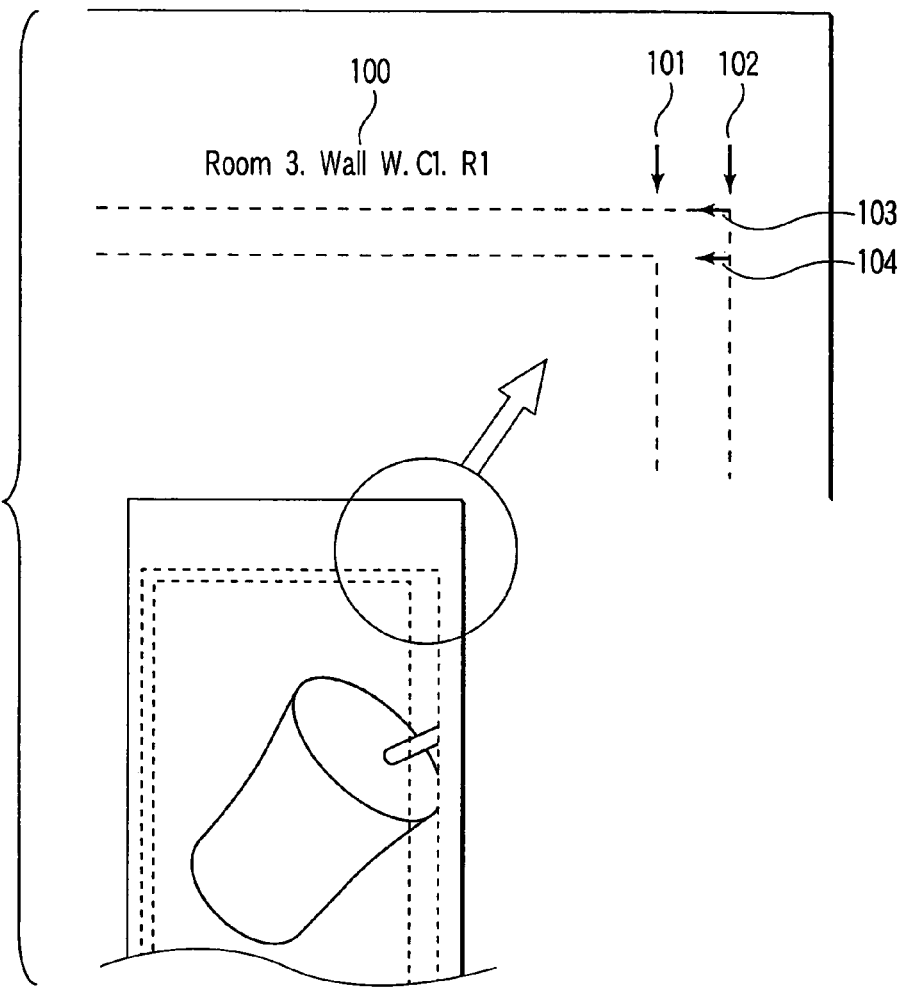
FIG. 15 is a view used for displaying information of a position at which wallpaper is attached and positioning in an attachment work of the wallpaper.

FIG. 15 shows its example. That is, FIG. 15 is an enlarged view showing an upper right corner of the piece of wallpaper a. The meaning of the solid line and the dotted line is equal to that in FIG. 14A and FIG. 14B.

Here, reference numeral 100 denotes information showing a position at which the piece of wallpaper is attached. That is, "Room 3" means a room No. 3 and indicates information for specifying a room. Further, "Wall W" means a wall on the west side and indicates information for specifying a wall surface. "C1" means a first column and corresponds to information for specifying a number of the column in which the piece of wallpaper is attached from the left side of the wall surface. "R1" means a first row and corresponds to information specifying a number of the row in which the piece of wallpaper is positioned from a ceiling.

If the piece of wallpaper extends from the ceiling to the floor, "1" is used. Meanwhile, if the wallpaper is discontinuous, the pieces of wallpaper are designated as "R1", "R2", . . . from the ceiling. Using such "information indicating a position at which the piece of wallpaper is attached" 100 enables specification of a part on the wall surface on which each piece of wallpaper is attached with no guesswork at a site where the wallpaper is attached.

It is to be noted that the "information for indicating a position at which the piece of wallpaper is attached" 100 means information with which an operator can directly or indirectly recognize a position at which the piece of wallpaper is attached. The information itself may directly indicate a position at which the piece of wallpaper is attached. Alternatively, a position at which the piece of wallpaper is attached may be indirectly recognized by making reference to another information. For example, a drawing such as shown in FIG. 13 is handed to an operator in advance, and information "a", "b" and others for specifying the piece of wallpaper is shown on each piece of wallpaper. In this case, the operator can indirectly specify positions of the pieces of wallpaper based on the information "a", "b" and others by making reference to a drawing such as shown in FIG. 13. Therefore, the information "a", "b" and others correspond to the "information indicating a position at which the piece of wallpaper is attached" 100.

Reference numerals 101 to 104 denote positioning indices for the wallpaper attaching work. That is, reference numeral 101 designates a rough standard index indicating a right-hand end position of the actual wall surface, and reference numeral 102 represents an index indicating a right-hand end position of a printing range. These indices 101 and 102 are information added to the upper margin. Reference numeral 104 denotes a rough standard index indicating an upper end position of the actual wall surface, and reference numeral 103 designates an index indicating an upper end position of a printing range. These indices 104 and 103 are added in the vicinity of an outer edge of the additional portion or the overlap portion in small. That is because printing is disabled on the right and left sides owing to the mechanism of the wallpaper printer 23. These indices 101 to 104 facilitate positioning in the site work.

Although it is preferable that the information 100 to 104 used for the wallpaper attaching operation is shown on the margin portion, the additional portion or the overlap portion, it may be shown on the back side. Further, if the information has a size or a color tone which can not disfigure the design, it may be shown in the design area. If the information is shown in the design area, an unobtrusive index such as a cross may be put in the design area and an eyemark may be attached on the index at the time of the wallpaper attachment. In this case, since centers of crosses can be pricked together by a needle and the like when overlapping the pieces of wallpaper, the work can be facilitated.

OPERATION FOR "LAYING OUT WALLPAPER SHEET" (step S107)

Subsequently, the wallpaper sheet layout function block 21G is used to determine the wallpaper sheet layout. With the wallpaper sheet layout, the finalized pieces of the wallpaper are arranged on the wallpaper sheet to examine how to arrange each piece of the wallpaper on the wallpaper sheet. In view of eliminating waste of the wallpaper sheet and of increasing the work efficiency by arranging the wallpaper pieces attached at adjacent positions on the wall surface also on the wallpaper sheet, the layout is automatically carried out. However, modification by an operator is also possible.

Figure 16:
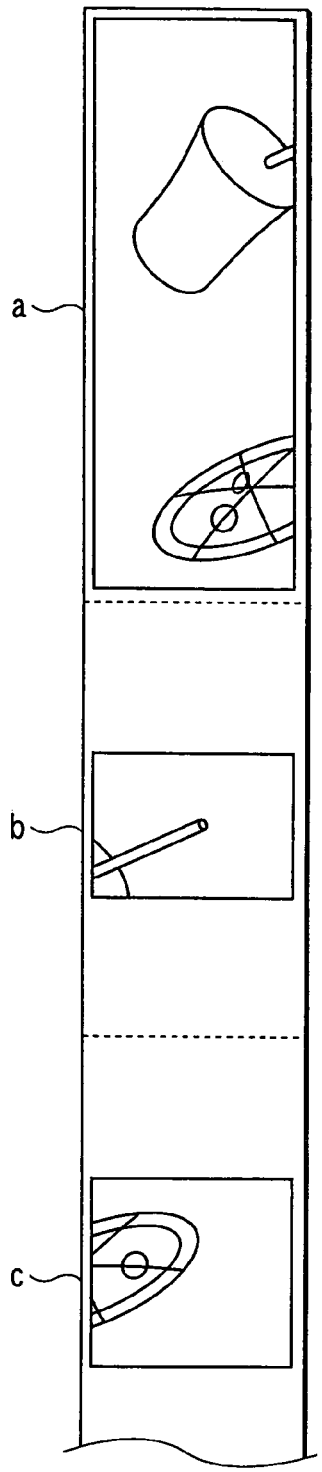
FIG. 16 is a view showing an example of a layout of a wallpaper sheet.

FIG. 16 shows an example of the wallpaper sheet layout. Determined pieces of the wallpaper a, b and c are arranged on the wallpaper sheet from the top. It is to be noted that a dotted line is indicative of a cutoff position.

OPERATION FOR GENERATING PRINTING "GENERATING PRINTING DATA (step S108)

Then, the printing data generating function block 21H is used to generate printing data based on a determined wallpaper sheet layout. As the printing data, it may be possible to take a data form being capable of directly driving the wallpaper printer 23, a data form such as CAD data having description of a dimension, a shape and a design, or image data.

"POST-STEP"

Thereafter, by using this printing data, the server computer 21 drives the wallpaper printer 23 to print the determined wallpaper sheet layout on the wallpaper sheet. The printed wallpaper is subjected to surface treatment in order to improve its water proofing property or resistance properties. The printed wallpaper is then carried in the form of a roll to a user-designated destination, e.g., a site where the wallpaper is attached. The paste is then applied to the wallpaper by the pasting device at the site. Thereafter the wallpaper is cut into each piece to be attached on the wall surface 50.

As described above, in the third embodiment, the wall surface dimension and shape fetching function block 21A is used to fetch the dimension and shape information of the wall surface 50 and lay out the wallpaper on the wall surface. Further, the dimension and shape of each piece of the laid out wallpaper is obtained. Accordingly, the layout suitable for the unique shape of the wall surface can be easily conducted. Additionally, the dimension and shape of each piece of the wallpaper can be immediately obtained from a result of layout, thereby improving the working efficiency. Therefore, in view of layout of the entire wall surface, the obtained wallpaper with the preferred dimension and shape can be attached at preferred positions.

Additionally, in the third embodiment, each piece of the wallpaper is laid out on the wallpaper sheet based on the dimension and the shape of each piece of the wallpaper. Therefore, positioning on the wallpaper sheet is possible with the layout suitable for the shape of each piece of the wallpaper. The wallpaper can be produced while avoiding waste.

Further, in the third embodiment, the dimension and shape information of the wall surface on which the wallpaper is attached is fetched and a desired design is applied on the wall surface so that the wallpaper is laid out on the wall surface. Thus, the design preferable for a unique shape or an application of the wall can be readily examined. Also, the preferred wallpaper layout on the wall surface can be facilitated in connection with the shape of the wall or the design (for example, an important design portion is not positioned on a boundary of adjacent pieces of the wallpaper or a corner portion). Moreover, the dimension, the shape and the design of the obtained wallpaper can be obtained so as to be suitable for the wall surface.

Furthermore, in the third embodiment, when laying out the wallpaper on the wall surface whose dimension and shape have been already known and generating the printing data of the laid out wallpaper, information of a position at which each piece of the wallpaper is attached is shown on each piece of the wallpaper based on the layout. It is, therefore, possible to manufacture the wallpaper which is superior in the working property at the time of attachment.

Further, the obtained wallpaper has the excellent working property at the time of attachment.

Additionally, in the third embodiment, when laying out the wallpaper on the wall surface whose dimension and shape have been already known and generating the printing data of the laid out wallpaper, a positioning index for the attachment work is shown on each piece of the wallpaper. Thus, it is possible to manufacture the wallpaper which is superior in the working property at the time of attachment. Further, the obtained wallpaper has the excellent working property at the time of attachment.

Furthermore, in the third embodiment, information of the dimension and the shape of a surface on which a wallpaper sheet is attached is fetched, and the design of the wallpaper sheet is fetched. Then, the wallpaper sheet is laid out on the surface based on predetermined layout conditions. Based on a result of this layout, the printing data for printing each wallpaper sheet which has been laid out is generated. Therefore, it is possible to manufacture the wallpaper having the design or the layout suitable for the dimension or the shape inherent to each wall surface. In other words, the obtained wallpaper has the design or the layout preferable for an individual wall surface.

Figure 17:
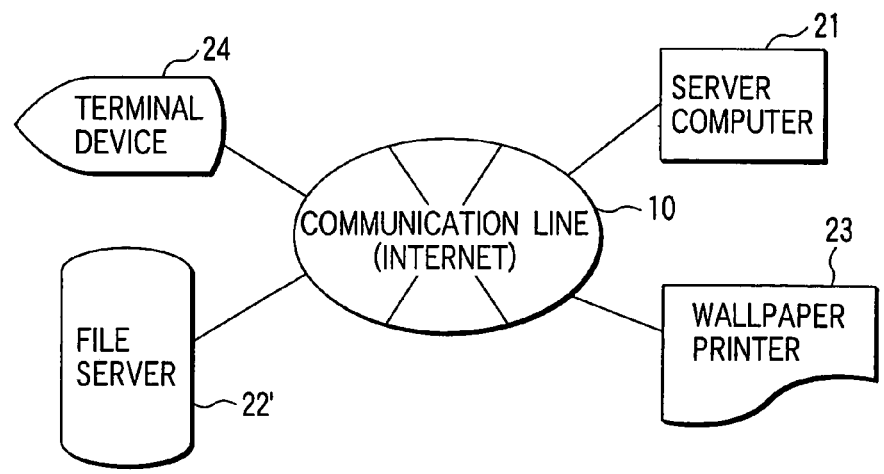
FIG. 17 is a view showing a structure of the wallpaper manufacturing apparatus according to the third embodiment in cases where each device is situated at a distanced position and each device is connected through a communication line.

Although above description of the third embodiment has showed an example of the wallpaper manufacturing apparatus having the wallpaper printer 23, the server computer 21, the terminal device 24 and the DB 22 provided at one site, the respective devices may be provided at separated positions and they may be connected to each other through a communication line. For example, in FIG. 17, the wallpaper printer 23, the server computer 21, the terminal device 24, and the DB 22 are connected to each other through a communication line (for example, the Internet 10). Incidentally, if the DB 22 has no line connection function, a file server,22 having the DB 22 connected thereto is connected to the Internet 10.

In addition, it is needless to say that the present invention can be constituted as the wallpaper manufacturing apparatus using a communication line such as the Internet 10 in the third embodiment as similar to the first and second embodiments. In this case, the OPERATION FOR "INPUTTING THE DIMENSION AND THE SIZE OF THE WALLPAPER" to the OPERATION FOR "DETERMINING THE SHAPE AND THE DESIGN OF THE WALLPAPER" can be substituted for each processing according to the second embodiment illustrated in FIG. 5 and executed. The OPERATION FOR "ADDING THE WORKING DISPLAY" to the OPERATION FOR "GENERATING THE PRINTING DATA" can be executed by a print subroutine at the step S35 in the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wallpaper manufacturing method, comprising the steps of:
    inputting dimension and shape information of a wall surface on which wallpaper is attached;
    determining a positional relationship between said wall surface and a design by applying design data of said wallpaper on a virtual wall surface based on said inputted dimension and shape information;
    determining on said virtual wall surface a shape and a position of each of a plurality of pieces of wallpaper attached on said wall surface while taking a width of said wallpaper into consideration; and
    determining a design, a dimension and a shape of each of a plurality of said pieces of wallpaper from said determined positional relationship between said wall surface and said design and said determined shape and position of each of a plurality of said pieces of wallpaper.

2. The method according to claim 1, further comprising:
    a step of laying out each piece of wallpaper on a wallpaper sheet based on said determined design, dimension and shape of each piece of wallpaper.

3. The method according to claim 2, further comprising:
    a step of generating wallpaper printing data based on said determined layout of each piece of wallpaper on said wallpaper sheet.

4. The method according to claim 1, further comprising:
    a step of overlapping a positioning mark on a design of each piece of wallpaper in an operation for attaching said wallpaper.

5. A wallpaper manufacturing apparatus, comprising:
    an input device for inputting dimension and shape information of a wall surface on which wallpaper is attached;
    a positional relationship determining device for determining a positional relationship between said wall surface and a design by applying design data of said wallpaper on a virtual wall surface based on said dimension and shape information inputted from said input device;
    a shape and position determining device for determining on said virtual wall surface a shape and a position of each of a plurality of pieces of wallpaper attached on said wall surface while taking a width of said wallpaper into consideration; and
    a wallpaper determining device for determining a design, a dimension and a shape of each of a plurality of said pieces of wallpaper from said positional relationship between said wall surface and said design determined by said positional relationship determining device and said shape and said position of each of a plurality of said pieces of wallpaper determined by said shape and position determining device.

6. A wallpaper manufacturing apparatus, comprising:
    input means for inputting dimension and shape information of a wall surface on which wallpaper is attached;
    positional relationship determining means for determining a positional relationship between said wall surface and a design by applying design data of said wallpaper on a virtual wall surface based on said dimension and shape information inputted from said input means;
    shape and position determining means for determining on said virtual wall surface a shape and a position of each of a plurality of pieces of wallpaper attached on said wall surface while taking a width of said wallpaper into consideration; and
    wallpaper determining means for determining a design, a dimension and a shape of each of a plurality of said pieces of wallpaper from said positional relationship between said wall surface and said design determined by said positional relationship determining means and said shape and said position of each of a plurality of said pieces of wallpaper determined by said shape and position determining means.

7. A program for causing a computer to execute following processing, comprising:

processing for inputting dimension and shape information of a wall surface on which wallpaper is attached;

processing for determining positional relationship between said wall surface and a design by applying design data of said wallpaper on a virtual wall surface based on said inputted dimension and shape information;

processing for determining on said virtual wall surface a shape and a position of each of a plurality of pieces of said wallpaper attached on a wall surface while taking a width of said wallpaper into consideration; and processing for determining a dimension and a shape of each of a plurality of pieces of said wallpaper from said determined positional relationship between said wall surface and said design and said determined shape and position of each of a plurality of said pieces of said wallpaper.

* * * * *